United States Patent [19]

Smith, Jr. et al.

[11] 4,308,372
[45] Dec. 29, 1981

[54] SHELF-STABLE ONE-PART ROOM TEMPERATURE VULCANIZABLE SILICONE RUBBER COMPOSITIONS

[75] Inventors: Alfred H. Smith, Jr., Ballston Lake; John J. Dziark, Waterford, both of N.Y.

[73] Assignee: General Electric Company, Waterford, N.Y.

[21] Appl. No.: 52,042

[22] Filed: Jun. 25, 1979

[51] Int. Cl.³ .............................................. C08G 77/04
[52] U.S. Cl. ............................ 528/34; 260/18 S; 260/37 SB; 528/33; 528/901; 556/413; 556/419; 556/436
[58] Field of Search ................ 528/34, 33, 901; 260/18 SB, 37 SB; 556/413, 419, 436

[56] References Cited

U.S. PATENT DOCUMENTS

| | | | |
|---|---|---|---|
| 2,938,009 | 5/1960 | Lucas | 260/37 |
| 3,004,859 | 10/1961 | Lichtenwalner | 260/46.5 |
| 3,035,016 | 5/1962 | Bruner | 260/46.5 |
| 3,065,194 | 11/1962 | Nitzsche et al. | 260/37 |
| 3,122,522 | 2/1964 | Brown et al. | 260/46.5 |
| 3,133,891 | 5/1964 | Ceyzeriat | 260/18 |
| 3,161,614 | 12/1964 | Brown et al. | 260/46.5 |
| 3,170,894 | 2/1965 | Brown et al. | 260/46.5 |
| 3,175,993 | 3/1965 | Weyenberg | 260/46.5 |
| 3,274,145 | 9/1966 | Dupree | 260/37 |
| 3,294,739 | 12/1966 | Weyenberg | 260/46.5 |
| 3,334,067 | 8/1967 | Weyenberg | 260/46.5 |
| 3,382,205 | 5/1968 | Beers | 260/37 |
| 3,383,355 | 5/1968 | Cooper | 260/46.5 |
| 3,499,859 | 3/1970 | Matherly | 260/37 |
| 3,517,001 | 6/1970 | Berger | 525/477 |
| 3,542,901 | 11/1970 | Cooper et al. | 260/825 |
| 3,635,743 | 1/1972 | Smith | 260/448.2 |
| 3,647,917 | 3/1972 | Schulz et al. | 260/825 |
| 3,689,454 | 9/1972 | Smith et al. | 260/46.5 |
| 3,708,467 | 1/1973 | Smith, Jr. et al. | 260/18 S |
| 3,719,635 | 3/1973 | Clark et al. | 260/46.5 |
| 3,730,932 | 5/1973 | De Zuba | 260/29.1 |
| 3,759,968 | 9/1973 | Berger et al. | 260/448.2 |
| 3,773,817 | 11/1973 | Berger et al. | 260/448.2 |
| 3,778,459 | 12/1973 | Berger et al. | 260/448.2 |
| 3,779,986 | 12/1973 | Smith et al. | 260/46.5 |
| 3,780,080 | 12/1973 | Berger et al. | 260/448.2 |
| 3,793,361 | 2/1974 | Berger et al. | 260/448.2 |
| 3,806,532 | 4/1974 | Bergen et al. | 260/448.2 |
| 3,808,248 | 4/1974 | Bergen et al. | 260/448.2 |
| 3,813,364 | 5/1974 | De Zuba et al. | 260/37 SB |
| 3,886,118 | 5/1975 | Nitzsche et al. | 260/37 SB |
| 3,891,123 | 7/1975 | De Zuba et al. | 260/32.6 A |
| 3,896,123 | 7/1975 | De Zuba et al. | 260/248 |
| 3,941,741 | 3/1976 | De Zuba | 260/37 SB |
| 4,036,813 | 7/1977 | Hardman et al. | 528/34 |

FOREIGN PATENT DOCUMENTS

1337516  3/1963  France .
1099619  1/1968  United Kingdom .

Primary Examiner—Melvyn I. Marquis

[57] ABSTRACT

A shelf-stable catalyst composition for a one-part room temperature vulcanizable silicone rubber composition comprising the reaction product of an adhesion promoter selected from the class consisting of silyl maleates, silyl fumarates, silyl succinates, silyl isocyanurates and silyl cyanurates and with an acyloxy functional cross-linking agent.

36 Claims, No Drawings

SHELF-STABLE ONE-PART ROOM TEMPERATURE VULCANIZABLE SILICONE RUBBER COMPOSITIONS

BACKGROUND OF THE INVENTION

The present invention relates to room temperature vulcanizable silicone rubber compositions and more particularly the present invention relates to one-component room temperature vulcanizable silicone rubber composition which are shelf-stable in the uncured state.

One-component room temperature vulcanizable silicone rubber compositions are well-known. Generally, such compositions comprise basic ingredients, a silanol terminated diorganopolysiloxane polymer, a filler which may either be a silica filler or one of the extending fillers, a crosslinking agent which may be an acyloxy functional silane or an alkoxy functional silane and a metal salt catalyst. When the cross-linking agent is an acyloxy functional silane, the catalyst is the metal salt of a carboxylic acid, where the metal varies from lead to manganese in the Periodic Table. When the cross-linking agent is an alkoxy functional silane, then the catalyst is a titanium chelate catalyst. In the present application we are concerned with an acyloxy functional silane cross-linking agent. Most commonly, such a cross-linking agent is a methyl triacetoxy silane and the metal salt of a carboxylic acid is a tin salt.

With such a composition the ingredients are most commonly packaged in the anhydrous state or substantially anhydrous state. When it is desired to cure the composition, the seal on the container is broken and the composition is applied to whatever form it is desired and when it is exposed to atmospheric moisture it will hydrolyze and cross-link to form a silicone elastomer with total cure taking place in about 24 hrs. Examples of Prior Art Patents and Patents relating to such one-component room temperature vulcanizable silicone rubber composition are as follows:

Selin et al U.S. Pat. No. 3,730,932;
Selin et al U.S. Pat. No. 3,941,741;
Selin et al U.S. Pat. No. 3,896,123;
Selin et al U.S. Pat. No. 3,813,365;
Selin et al U.S. Pat. No. 3,780,080;
Selin et al U.S. Pat. No. 3,793,361;
Selin et al U.S. Pat. No. 3,778,459;
Selin et al U.S. Pat. No. 3,773,817;
Selin et al U.S. Pat. No. 3,808,248;
Selin et al U.S. Pat. No. 3,806,532;
Dupree U.S. Pat. No. 3,274,145;
A. H. Smith Ser. No. 16,255;
M. D. Beers Ser. No. 919,544;
Berger and Selin U.S. Pat. No. 3,759,968;
Nitzsche and Wick U.S. Pat. No. 3,065,194; Bruner U.S. Pat. No. 3,035,016;
Ceyzeriat U.S. Pat. No. 3,133,891;
Brown et al U.S. Pat. No. 3,161,614;
Cooper U.S. Pat. No. 3,383,355;
Matherly U.S. Pat. No. 3,499,859;
Cooper et al U.S. Pat. No. 3,542,901;
Brown et al U.S. Pat. No. 3,122,522;
Brown et al U.S. Pat. No. 3,170,894;
Weyenberg U.S. Pat. No. 3,175,993;
Smith and Hamilton U.S. Pat. No. 3,689,454;
Smith and Hamilton U.S. Pat. No. 3,779,986;
Weyenberg U.S. Pat. No. 3,294,739;
Weyenberg U.S. Pat. No. 3,334,067;
Clark et al U.S. Pat. No. 3,719,635;
M. D. Beers U.S. Pat. No. 3,382,205;
Berger U.S. Pat. No. 3,517,001;
Smith and Beers U.S. Pat. No. 3,708,467;
Lucas U.S. Pat. No. 2,938,009;
Lichtenwalner U.S. Pat. No. 3,004,859;
Smith U.S. Pat. No. 3,635,743.

The above patents disclose a number of additive and various other types of formulations which these one-component room temperature vulcanizable silicone rubber compositions can have.

Recently, however, there was developed a new type of one-component room temperature vulcanizable silicone rubber composition as disclosed in Beers Patent Application Ser. No. 919,544, filed June 27, 1978, and entitled "Curable Compositions and Processes and now abandoned." A composition disclosed in this patent application comprises as its basic ingredients a silanol chainstopped polydiorganosiloxane, a fluid polysiloxane having a high degree tri- or tetrafunctionality, a silica filler, a cross-linking agent silane which is acyloxy functional and a highly reactive tin containing silanol condensation catalyst. One of the novel aspects of this patent application was the disclosure for a cross-linking agent such as methyl tris(2-ethylhexanoxy) silane or methyl tris(benzoxy) silane. There was found that a one-component or one-part room temperature vulcanizable silicone rubber composition which had such a cross-linking agent in combination with a fluid polysiloxane having a high degree of tri- or tetrafunctionality; that such a composition produced a silicone elastomer that had high heat resistance, low corrosiveness and a slight odor. It should be noted that the compositions in which the cross-linking agent is methyl triacetoxy silane are objectionable to some people because of the strong odor of acetic acid that is given off by such compositions when they are curing to form a silicone elastomer.

Another application on a system that was an improvement in some ways of the Beers Application, Ser. No. 919,544, now abandoned, is that to be found in the Smith and Beers Patent Application 60 SI-223, Ser. No. 16,255 filed on Feb. 28, 1979 now U.S. Pat. No. 4,247,445. That Patent Application, Ser. No. 16,255 now U.S. Pat. No. 4,247,445, concerns the production of a paintable one-component room temperature vulcanizable silicone rubber composition which is paintable in the cured elastomeric state. One of the means for accomplishing this as disclosed in the Patent Application of Smith et al, Ser. No. 16,225 now U.S. Pat. No. 4,247,445, is the use of large amounts of calcium carbonate filler in the composition among the other improvements. However, in another vein, ther composition disclosed in Beers Ser. No. 919,544, now abandoned, did not have sufficient adhesion to various substrates such as plastic substrates and metal substrates.

It was highly desirable to have the composition of the foregoing Beers Ser. No. 919,544, now abandoned, be self-bonding, that is, that the composition bond to another substrate without the use of a primer by the incorporation of an additive into the composition when it was manufactured. It should be noted that Ser. No. 919,544, now abandoned, of the Beers Patent Application attempts to make the composition self-bonding and the composition is self-bonding to a certain extent by the use of silyl isocyanurates as adhesion promoter additives. An attempt was successfully made to improve the self-bonding characteristics of the Beers Ser. No. 919,544, (now abandoned) composition as disclosed in the Patent Application of Smith et al, Ser. No. 16,254 filed Feb. 28, 1979 now U.S. Pat. No. 4,273,698. This disclosure, that is, Ser. No. 16,254 now U.S. Pat. No. 4,273,698, discloses the use of silyl maleates, silyl fumarates and silyl succinates as adhesion promoters for the one-component room temperature vulcanizable silicone rubber composition which has an acyloxy functional silane cross-linking agent.

The use of such silyl maleates and silyl fumarates as adhesion promoters results in a one-component room temperature vulcanizable silicone rubber composition with improved adhesion properties to plastics and metals and self-bonding properties to plastics and metals over the prior composition of the Beers, Ser. No. 919,544 Patent Application now abandoned. However, there was one great disadvantage in the use of self-bonding adhesion promoters in such compositions. The disadvantage was that the shelf-like of the uncured composition was seriously degraded. Thus, by accelerated shelf-aging tests there were made on such compositions having the silyl maleates and even the silyl isocyanurate adhesion promoters in the uncured composition wherein the accelerated shelf-aging test the composition was stored at 50° C. for as little as 15 days and for as long as 30 days at 50° C.; it was found that under such conditions the strength of the composition would be lowered from 225 to 51 psi and would go to 0 psi after 30 days of accelerated shelf-aging at 50° C. There was a comparable falling off the Shore A Hardness and also the Elongation in such accelerated shelf-aging test.

Accordingly, in such accelerated shelf-aging data that was obtained, it appears that adhesion promoters and specifically the silyl maleate, silyl fumarate, silyl succinate and silyl isocyanurate adhesion promoters would be difficult to use with the Beers, Ser. No. 919,544, (now abandoned) composition. It was only recently, unexpectedly discovered that by pre-reacting the cross-linking agent with an adhesion promoter, that this degradation in the physical properties of the cured composition could be avoided and that the composition would have good shelf-stability.

It is one object of the present invention to provide for a one-component room temperature vulcanizable silicone rubber composition which has good shelf-stability. It is an additional object of the present invention to provide for a one-component room temperature vulcanizable silicone rubber composition which has as adhesion promoter methyl tris(2-ethylhexanoxy) silane as a cross-linking agent.

It is yet an additional object of the present invention to provide for a one-component room temperature vulcanizable silicone rubber composition in which the adhesion promoter is pre-reacted with the cross-linking agent wherein pre-reacted reaction product is incorporated into the composition in order to make the composition shelf-stable.

These and other objects of the present invention are accomplished by means of the disclosure set forth herein below.

SUMMARY OF THE INVENTION

In accordance with the above objects, there is provided by the present invention a shelf-stable catalyst composition of a one-part room temperature vulcanizable silicone rubber composition comprising the reaction product of an adhesion promoter selected from the class consisting of silyl maleates, silyl fumarates, silyl succinates, silyl isocyanurates and silyl cyanurates with an acyloxy functional silane cross-linking agent. The present invention is especially advantageous when the adhesion promoter is a silyl maleate or a silyl fumarate and the cross-linking agent is methyl tris (2-ethylhexanoxy) silane.

Preferably there is used from 40 to 80 parts by weight of the acyloxy functional silane with from 5 to 15 parts by weight of the adhesion promoter. This pre-reacted reaction product is incorporated into the base silanol end-stopped diorganopolysiloxane polymer along with a filler if it is desired and with a catalyst, which is a metal salt of a carboxylic acid, where the metal is selected from the group varying from lead to manganese in the Periodic Table. It should be noted that the metal salt of a carboxylic acid may be added to the adhesion promoter and cross-linking agent prior to the reaction of the two to form the reaction product or it may be added after the pre-treated reaction product is formed. In either case the composition is effective. What constitutes the present invention is the pre-reaction of the cross-linking agent with the adhesion promoter and/or an organo metallic salt catalyst prior to incorporating these ingredients into the base silanol end-stopped diorganopolysiloxane polymer and the other ingredients that are present in the one-component uncured room temperature vulcanizable silicone rubber composition.

DESCRIPTION OF THE PREFERRED EMBODIMENT

There is provided by the present invention, shelf-stable one-component room temperature vulcanizable silicone rubber composition. By shelf-stable, it is meant that the composition can be stored in the uncured state for prolonged periods of time, but for at least a one year period without the storage or the length of storage effecting the properties of the cured composition. By properties, it is meant, the physical properties of the cured composition such as tensile strength, elongation, hardness, etc. This is accomplished in the instant invention by reacting an adhesion promoter selected from the class consisting of silyl maleates, silyl fumarates, silyl isocyanurates, silyl succinates and silyl cyanurates with an acyloxy functional silane cross-linking agent. The silyl maleates, silyl fumarates it is meant that sily maleates, silyl fumarates, silyl succinates as those disclosed in Ser. No. 16,254 now U.S. Pat. No. 4,273,698, the invention of Smith/DeZuba/Mitchell, entitled "Self-Bonding Room Temperature Vulcanizable Silicone Rubber Compositions."

An example of self-bonding adhesion promoters that will work in the present invention are for instance those of the formula,

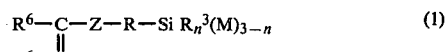 (1)

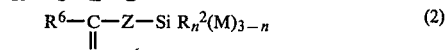 (2)

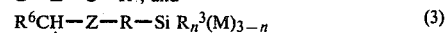 (3)

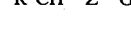

where Z is selected from

phenylene,

COHN and CONR$_2^2$ G is selected from the class consisting of hydrogen, R', R$^4$Si R$_n^2$(M)$_{3-n}$ where R' is selected from monovalent hydrocarbon radicals and halogenated monovalent hydrocarbon radicals, R and R$^4$ is a divalent hydrocarbon radical, R$^2$ is selected from monovalent hydrocarbon radicals and halogenated monovalent hydrocarbon radicals, M is selected from R$^3$O and

radicals, R$^3$ is selected from monovalent hydrocarbon radicals and halogenated monovalent hydrocarbon radicals, R$^6$ is selected from hydrogen, and alkyl radicals of up to 10 carbon atoms and n is a whole number that varies from 1 to 3, and self-bonding polysiloxane additives selected from the group consisting of the formulas,

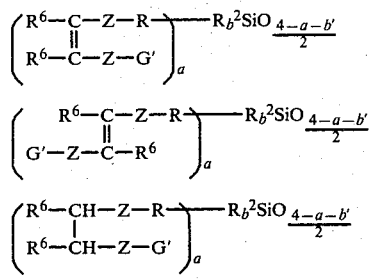

where G' is selected from the class consisting of hydrogen, R' and R$^4$H$_c$R$_d^2$SiO$_{(3-c-d/2)}$ and where Z, R', R$^4$, R$^2$ and R are as previously defined, a varies from 0.005 to 2.0, b' varies from 1.0 to 2.5, the sum of a+b varies from 1.005 to 3.0, c varies from 0 to 1.0, d varies from 1.0 to 2.5 and the sum of c+d varies from 1.0 to 2.0. It should be noted that only the silyl isocyanurates, silyl cyanurates, silyl maleates, silyl fumarates and silyl succinates disclosed above will work as adhesion promoters in compositions of the present case since only such compounds are soluble with the components of one-component room temperature vulcanizable silicone rubber composition of the present case. It should be noted that within the above description there is included not only silyl maleates in which there is one silicone atom in the maleate, fumarate and succinate, but there is also included polysiloxane maleates and polysiloxane fumarates and succinates. For a fuller description of the use and properties of these silyl maleates, silyl fumarates and also silyl succinates as adhesion promoters in one-component room temperature vulcanizable silicone rubber compositions of the present cases, one is referred to the foregoing patent application having Ser. No. 16,254 now U.S. Pat. No. 4,273,698.

With respect to the silyl isocyanurates suitable compounds are those of the formula,

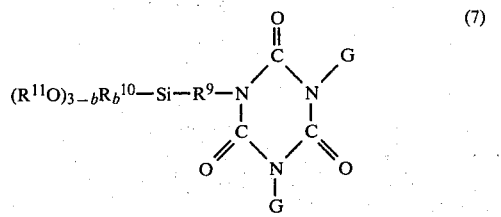

wherein G is a (R$^{11}$O)$_{3-b}$ —R$_b^{10}$—Si—R$^9$ radical, styryl, vinyl, allyl, chloroallyl or cyclohexenyl radical or a R$^{10}$ radical, as hereinafter defined; R$^9$ is a divalent radical selected from alkylenearylene, alkylene, cycloalkylene and halo-substituted such divalent radicals; R$^{10}$ is a radical of up to 8 carbon atoms selected from hydrocarbyl or halohydrocarbyl and R$^{11}$ is a radical of the type defined for R$^{10}$ and also cyano lower alkyl; and b is 0 to 3.

Such adhesion promoters are disclosed in Berger, U.S. Pat. No. 3,517,001, which is incorporated herein by reference. The preferred such promoters are 1, 3, 5-tris-trimethoxysilylpropylisocyanurate and bis-1, 3-trimethoxysilylpropylisocyanurate, the former being most preferred.

For further reference to silyl isocyanurate adhesion promoters, which may be utilized in the instant invention, one is referred to the Patent Application of Dale Beers Ser. No. 919,544, filed on June 27, 1978, now abandoned, which is hereby incorporated by reference and Berger U.S. Pat. No. 3,517,001 which is also incorporated by reference into the present case.

For silyl cyanurates reference is U.S. Pat. No. 3,896,123 which is incorporated into the instant case by reference. The silyl cyanurate has the formula,

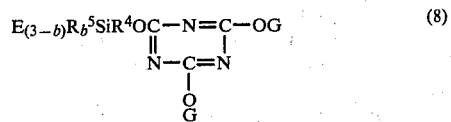

In the above formulas, R' is selected from unsaturated monovalent hydrocarbon radicals and unsaturated halogenated monovalent hydrocarbon radicals. G is selected from R' radicals from the formula,

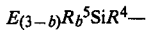

where E is selected from R$^6$O radicals and R$^6$COO radicals, where R$^5$ and R$^6$ are selected from monovalent hydrocarbon radicals and halogenated monovalent hydrocarbon radicals, R$^4$ is selected from divalent hydrocarbon radicals and halogenated divalent hydrocarbon radicals and b is a whole number equal to 0 to 3, inclusive. For further reference as to this type of adhesion promoter and the process by which is is made one is referred to the foregoing U.S. Pat. No. 3,896,123 which is hereby incorporated by reference.

Accordingly, there is included by adhesion promoters to which the present invention applies in the present compositions, silyl maleates, silyl fumarates, silyl succinates, silyl isocyanurates and silyl cyanurates. The compounds of the formulas shown the above method of preparation and other properties are more fully described in the U.S. Patents referred to herein above which patents are incorporated by reference into the present case. With respect to the acyloxy functional silane preferably the acyloxy functional silane has the formula, $$R_a Si(OAc)_{4-a} \qquad (9)$$

where R is a monovalent radical, Ac is an acyloxy radical containing 2 to 30 carbon atoms and a varies from 1 to 3. Most preferably the acyloxy radical has from 6 to 30 carbon atoms and a is equal to 1. Two, prepare the reaction product catalyst or reaction product cross-linking agent mixture, there is taken from generally from 40 to 80 parts by weight of the acyloxy functional silane and generally from 5 to 15 parts by weight of the adhesion promoter. The adhesion promoter reference is made to the foregoing silyl cycanurate, silyl isocyanurate, silyl succinate, silyl maleate and silyl fumarate. More preferably there is utilized from 50 to 70 parts by weight of the acyloxy functional silane cross-linking agent and from 5 to 10 parts by weight of the adhesion promoter.

The reaction product, which prolongs the shelf-life of the uncured room temperature vulcanizable silicone rubber compositions of the instant case, is obtained by reacting the adhesion promoter with the acyloxy functional silane cross-linking agent at a temperature in the range of 50° to 150° C. for a period of time varying from 1 hour to 7 days. It would be appreciated that the higher the temperature the shorter the period of time and thus if the composition was heated to form the reaction product at 150° C., then the period of heating would be 1 hour more or less. More preferably, there is utilized as a reaction temperature a temperature in the range of 80° to 110° C. where the reaction product is heated for a period of time preferably varying from 8 hours to 4 hours. To obtain the shelf-stability inducing reaction product of the instant case it is merely sufficient to mix the adhesion promoter with the acyloxy functional silane cross-linking agent and allow the heated mixture to remain at that temperature for a sufficient period of time to produce the desired product. It should be noted with respect to the acyloxy functional silane of the foregoing formula mentioned above that although such silane may be methyl triacetoxy silane, it is preferably one in which the acyl group has from 6 to 30 carbon atoms. Most preferably, the acyloxy functional silane as methyl tris(-benzoxy) silane and most preferably it is methyl tris(2-ethylhexanoxy) silane. It should also be mentioned that the preferred reaction temperature that has been given above for the reaction of the adhesion promoter with the acyloxy functional silane is especially preferred for the silyl maleate and silyl fumarate adhesion reaction products. The specifically preferred adhesion promoter for the silyl isocyanurate is preferably 1, 3, 5-tris-trimethoxysilylpropylisocyanurate. With respect to the silyl maleate adhesion promoter when such an adhesion promoter is utilized, a specific preferred silyl maleate is bis(trimethoxysilylpropyl) maleate. Although the above specific silyl isocyanurate and silyl maleate are the specific preferred adhesion promoters others within the scope of the above formulas given previously can be utilized with equal facility in the present invention. The pre-reacted cross-linking agent in the adhesion promoter mixture will be made or produced with equal facility. Accordingly, the process is simply to take the adhesion promoter and react it with the cross-linking agent and/or organo metallic salt prior to the mixing of the other ingredients at a temperature and for the period of time mentioned before until the pre-reacted reaction product is obtained. It should be noted that the optimum desired reaction product was evaluated for the preferred reaction times and temperatures that have been mentioned above by taking such reaction products for various times at various temperatures and utilizing them in one-component room temperature vulcanizable silicone rubber composition and then determining the shelf-life of the composition by accelerated shelf-aging. In this way, the preferred or optimum reaction times were found for the adhesion promoters of the present case which optimum reaction times and temperatures yield pre-reacted adhesion promoter cross-linking agent mixtures which yielded the maximum shelf-stability in one-component room temperature vulcanizable silicone rubber compositions.

As is known, the present composition also has a catalyst, which comprises the metal salt of a carboxylic acid with the metal selected from the group consisting of from lead to manganese in the Periodic Table. Such a catalyst can be added to the pre-reacted mixture after the reaction or before the reaction. It has been found to have little effect on the final properties of the composition irrespective of when it is added. However as been stated previously, the metal salt of a carboxylic acid can be added to the adhesion promoter and the cross-linking agent prior or after the reaction of the two without any change in properties of the final cured composition. To 100 parts by weight of the adhesion promotor acyloxy functional silane mixture there may be added from 0.01 to 15 parts by weight of a metal salt of a carboxylic acid with the metal varying from lead to manganese in the Periodic Table. It should be noted that this is a true catalyst of the composition, however, in silicone manufacturing terminology, the mixture of the cross-linking agent with the adhesion promoter is also referred to as the catalyst mixture. Accordingly, in the present case, by catalyst pre-reacted product it is referred to solely the reacted product of the adhesion promoter with the acyloxy functional silane and by the catalyst compound itself there is referred to the metal salt of a carboxylic acid.

The metal salt of a carboxylic acid can be preferably one in which the organic group contains from 2 to 6 carbon atoms such as dibutyl tin diacetate. However, in the broader embodiment the organic groups in the metal salt of a carboxylic acid can be of any size such as up to 30 carbon atoms or more. The only limitation in the carbon atom group of the catalyst being its solubility in the rest of the composition, that is if it is not very soluble in the composition, it will not function that effectively as a catalyst.

To prepare the room temperature vulcanizable silicone rubber composition within the scope of the instant case, the pre-reacted reaction product of the adhesion promoter and the acyloxy functional silane is added to a silanol end-stopped diorganopolysiloxane polymer under substantially anhydrous conditions. Generally, such a polymer has a viscosity varying anywhere from 500 to 1,000,000 centipoise at 25° C. and the organo group in such polymers are selected from monovalent hydrocarbon radicals, specifically, such a silanol end-stopped diorganopolysiloxane polymer may be of the formula,

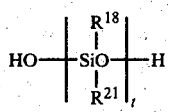 (10)

where $R^{18}$ and $R^{21}$ are monovalent hydrocarbon radicals and preferably are alkyl radicals and t varies such that the polymer has a viscosity varying from 500 to 1,000,000 centipoise at 25° C.

Generally, there will be utilized per 100 parts of the silanol polymer by weoght from 2 to 20 parts by weight of the pre-reacted catalyst reaction product whether or not the metal salt of a carboxylic acid is included. If the metal salt of a carboxylic acid is included in the pre-reacted catalyst mixture, then the addition of the catalyst composition would still be in the same weight ratio. If the catalyst compound of the metal salt of a carboxylic acid is not included in the pre-reacted product mixture that is added to the silanol end-stopped polymer then there may be added anywhere from 0.01 to 5 parts by weight of the metal salt of a carboxylic acid to the silanol polymer per 100 parts of the silanol polymer as is needed.

Such a composition forms the basic one-component room temperature vulcanizable silicone rubber composition. The ingredients are simply mixed in the anhydrous state or substantially anhydrous state and when it is desired to cure the composition, the seal on the container is broken and the composition is applied and exposed to atmospheric moisture whereupon it will cure to a silicone elastomer, total cure taking place in about 24 hrs. In order for the composition to have proper physical properties in especially Tensile Strength, it is necessary for it to have a filler. Accordingly, there may be incorporated into the composition of anywhere from 4 to 500 parts by weight or more of a filler selected from reinforcing fillers and extending fillers. Examples of reinforcing fillers are for instance, fumed silica and precipitated silica. Examples of extending fillers are fillers such as titanium iron oxide, aluminum oxide, diatomaceous earth, calcium carbonate, quartz diatomaceous silica, aluminum silicate, zinc oxide, zirconium silicate, iron sulfate, zinc sulfide, aluminum silicate and other types of silicates. If it is desired to have flame-retardants in the compositions, small amounts of carbon black can be included or carbon black can be included as a filler and also as a pigment if it is desired to have a black composition. It is generally desired to have at least 4 parts by weight of silica filler in the composition to give the composition sag-control, that is, so the composition will not flow out of vertical or overhead joints, but will stay in place when it is caulked into position. This property is important for construction sealants. However, the composition may have more fumed silica in it since that enhances the Tensile Strength of the composition. Preferably, such fumed silica or precipitated silica is treated with cyclic siloxanes and/or silazanes and/or diethyl hydroxyl amine or ammonia to yield a treated filler which will enhance the physical properties of the composition and impart sag-control to the composition but will in small amounts not deleteriously effect the viscosity of the uncured composition. Most preferably the fumed silica fillers are treated with cyclosiloxanes such as octamethylcyclotetrasiloxane in order to improve the filler, with respect to the fact that it will increase the Tensile Strength of the composition without deleteriously effecting its uncured viscosity. As noted in Ser. No. 16,255 the Patent Application of Beers/Smith, now U.S. Pat. No. 4,247,445, a large amount of calcium carbonate can be added to the composition of the instant case and specifically ones in which the cross-linking agent is methyl tris(2-ethylhexanoxy) silane for the purpose of making the composition paintable.

There may also be incorporated into the composition from 2 to 20 parts by weight base on 100 parts the silanol end-stopped diorganopolysiloxane polymer of a fluid polysiloxane containing a high degree of trifunctionality, tetrafunctionality or a mixture of tri- and tetrafunctionality and comprising;
(i) 5 to 60 mole percent of monoalkyl siloxy units, siloxy units, or a mixture of such units;
(ii) from 1 to 6 mole percent of trialkyl siloxy units;
(iii) from 34 to 94 mole percent of dialkyl siloxy units;
said fluid polysiloxane containing from about 0.1 to 2 percent by weight of silicon bonded hydroxyl groups. Such a material is added for the purpose of increasing the high thermal stability of the composition. It also increases the adhesion of the self-bonding characteristics of the composition. It should be noted that unlike the filler, which is most always needed for Tensile Strength purposes in the composition even though there be only small amounts of it present or large amounts of it present, as the case may be, such as for instance in order to make the composition paintable the use of this fluid polysiloxane having a high degree of trifunctionality or tetrafunctionality in the present composition is optional. However, it is highly desired to have it in the composition if the composition is going to be exposed to high temperature for long periods of times. It is especially desirable with the composition in which the cross-linking agent is an acyloxy functional silane having from 6 to 30 carbon atoms such as methyl tris(2-ethylhexanoxy) silane. Example of such a composition is for instance to be found in Beers Patent Application, Ser. No. 919,544, filed June 27, 1978, now abandoned which is hereby incorporated by reference into the instant case.

It is disclosed in that case, that there may also be present in the composition from 1 to 10 parts by weight per 100 parts of the silanol end-stopped polymer of a finely divided iron oxide stabilizer. This is highly desirable if it is necessary to make a high temperature stable composition, but it is optional with the invention of the instant case.

The invention of the instant case is to make a shelf-stable one-part room temperature vulcanizable silicone rubber composition in which there is present an adhesion promoter selected from silyl maleates, silyl fumarates, silyl succinates, silyl isocyanurates and silyl cyanurates and where there is an acyloxy functional silane cross-linking agent and preferably an acyloxy functional silane cross-linking agent where the acyloxy group has from 6 to 30 carbon atoms. As mentioned previously, there may be utilized at least 4 parts of fumed silica in the composition whether treated or untreated to impart to the composition sag-control properties. However, if it is desired not to add anymore fumed silica for the purpose of imparting sag-control to the composition, there may be added to the composition from 0.03 to 2 parts by weight per 100 parts of the silanol polymer of a polyether as a sag-control additive in addition to the fumed silica. The polyether may be any polyether having propylene oxide and ethylene oxide groups in the polyether and which are normally sold under the Tradename UCON by Union Carbide Corp. and sold under the Tradename of PLURACOL by the Wyandotte Chem. Corp. Examples of such polyethers as sag-control additives in one-component room temperature vulcanizable silicone rubber compositions is for instance to be found in the Patent Application of Wright/Lampe/Smith, Ser. No. 34,212, now U.S. Pat. No. 4,261,758, entitled "Room Temperature Vulcanizable Silicone Rubber Compositions With Sag-Control." This is a even more optional ingredient then the other ingredients and it is only useful to produce construction sealants in which it is desired to maintain the viscosity of the composition as low as posible in the uncured state and to keep the elongation of the composition as high as possible, which is done by keeping the amount of fumed silica in the composition as low as possible. Accordingly, to make a construction sealant with efficient sag-control, it is generally practiced to add about 4 parts of treated fumed silica, which has been treated with cyclicsiloxanes into the composition and add the rest of a sag-control additive in terms of the polyether as mentioned above, which results in a composition with good sag-control and with a high percent elongation and with low uncured viscosity properties.

Finally, there may be a plasticizer inserted into the composition. Generally, per 100 parts of the silanol polymer there may be from 1 to 50 parts by weight of a triorgano silyl end-stopped diorganopolysiloxane polymer having from 10 to 5,000 centipoise viscosity where said organo groups are monovalent hydrocarbon radicals.

It should also be noted that the foregoing Patent Application of Wright/Lampe/Smith is incorporated into the present case by reference for the purposes of identifying the polyether, as used in the instant composition, with more detail than is given in the present case.

With respect to the triorgano silyl end-stopped diorganopolysiloxane polymer, such a polymer is utilized as a plasticizer in the instant composition. It is a polysiloxane filler which plasticizes the composition and keeps its viscosity low in the uncured state without detracting from the physical properties of the composition other than increasing the percent in elongation.

The organo groups in such triorgano silyl end-stopped diorganopolysiloxane polymer as well $R^{18}$ and $R^{21}$ groups in the silanol end-stopped diorganopolysiloxane polymer formula are selected from many monovalent hydrocarbon radical and halogenated monovalent hydrocarbon radicals; for instance, such groups may be selected from alkyl groups such as methyl, ethyl, propyl, cycloalkyl groups such as cyclohexyl, cycloheptyl, cyclooctyl; alkenyl groups such as vinyl, allyl; mononuclear aryl groups such as phenyl, methylphenyl, ethylphenyl, etc.; and haloalkyl groups such as 3,3,3-trifluoropropyl, etc. Most preferably, the foregoing organo radicals of the silanol end-stopped diorganopolysiloxane polymer such as $R^{18}$ and $R^{21}$ in the foregoing organo groups of the triorganosilyl end-stopped polysiloxane polymer are selected from alkyl radicals of 1 to 8 carbon atoms, vinyl radicals and phenyl radicals. The process for making the silanol end-stopped diorganopolysiloxane polymer is well-known in the art and generally comprises reacting cyclosiloxanes and specifically cyclotetrasiloxanes for the appropriate substituent groups in the presence of low molecular weight silanol terminated diorganopolysiloxane polymers or in the presence of water with potassium hydroxide as the catalyst. When the equilibration reaction is over the catalyst is neutralized with an acid such as sulfuric acid or a silyl phosphate and the unreacted cyclics are vented to yield the desired polymer.

The triorgano silyl end-stopped and diorganopolysiloxane polymer is made in the same way except there is utilized as chainstoppers instead of water, low molecular weight triorgano silyl end-stopped polymers such as hexamethyldisiloxane, etc. There is also preferably utilized, an acid catalyst as the catalyst for forming such a triorgano silyl end-stopped diorganopolysiloxane polymers such as toluene sulfonic acid or an acid activated clay. After the reaction is over the acid activated clay is filtered out or the toluene sulfonic acid is neutralized with a base to yield desired triorgano silyl end-stopped diorganopolysiloxane polymer. It should be noted that by the method by which such polymer is made, there is normally incorporated some silanol groups into the polymer. It is not meant to incorporate the silanol groups into the polymer, but these silanol groups become inserted in the polymer incidentally as a result of the process of equilibration utilizing as a chainstopper the low molecular weight triorgano silyl end-stopped diorganopolysiloxane chainstopper which is for instance, as noted previously, hexamethyldisilazane. Silanol groups are incorporated into the finished polymer by the use of other chainstoppers which are made by hydrolyzing triorganochlorosilanes with diorganodichlorosilanes. Even in most processes of separation there is some water in the chainstopper that finally becomes purified and such water is incorporated into the finished triorgano silyl end-stopped diorganopolysiloxane polymer.

As stated previously, the important part of the present invention is to react acyloxy functional silane in the proportions mentioned previously with an adhesion promoter to pre-react the two either in the presence or absence of a metal salt of a carboxylic acid, to then add the metal salt of a carboxylic acid to the composition if it is not already present in the quantities mentioned previously and to then incorporate this catalyst mixture into the base silanol polymer with or without filler in it under substantially anhydrous conditions. It should also be noted that other optional ingredients may be added to the composition which are not mentioned above, such as for instance flame-retardant additives and other types of thermal stabilizing additives, oil resistant additives, etc. The composition is packaged in the anhydrous state or substantially anhydrous state and when it is desired to cure the composition, the seal on the package is broken and the composition is applied and exposed to atmospheric moisture whereupon it will cure to a silicone elastomer. A skin will form in as little as 10 minutes over the composition and fully cure into the silicone elastomer in 24 hrs.

It should be also noted that methyl tris(benzoxy)silane and methyl tris (2-ethylhexanoxy)silane are preferred acyloxy cross-linking agents in the invention of the instant case, since they give a composition which has a slight odor and has low corrosion characteristics. Such compositions also are those disclosed in the foregoing Ser. No. 16,254, now U.S. Pat. No. 4,273,698 Ser. No. 16,255 now U.S. Pat. No. 4,247,445, and Ser. No. 919,544 Patent Application, now abandoned, mentioned previously, result in compositions with various types of advantages depending on how the composition is formulated. The invention of this instant case applies to all such compositions as well as to all compositions in which there is an acyloxy functional cross-linker agent in combination with an adhesion promoter which is selected from silyl maleates, silyl fumarates, silyl succinates, silyl isocyanurates and silyl cyanurates. The examples below are given for the purpose of illustrating the present invention, they are not given for any purpose of setting limitations to the claims of the disclosure of the instant case. All parts are by weight.

EXAMPLE 1

There was prepared 1,000 parts by weight of a basic Composition A consisting of 100 parts by weight of a silanol end-stopped dimethylpolysiloxane polymer having a viscosity of 60,000 centipoise, 16 parts of octamethyl cyclotetrasiloxane treated fumed silica filler, 10 parts of an oil having 20 mole percent of monomethyl siloxy units, 76 mole percent of dimethyl siloxy units and 4 mole percent of trimethyl siloxy units, said polymer having 0.9% silanol content, to which was added 10 parts by weight of 100 centipoise viscosity at 25° C. of a trimethyl siloxy end-stopped dimethylpolysiloxane oil and 0.3 parts of a polyether which is sold under the tradename UCON LB 1145 by Union Carbide Corporation. To 1,000 parts by weight of the above Composition A, there was added 70.4 parts of a solution containing 60 parts of methyl tris(2-ethylhexanoxy)silane, 10 parts of 1,3,5-tris-trimethoxyl silylpropylisocyanurate and 0.4 parts of dibutyl tin diacetate. ASTM sheets were prepared from the compounded material and cured for 7 days at 70° F. and 50% Relative Humidity. The cured material has the following properties: Shore A 20, Tensil psi 225, Elongation 862. A portion of the compounded material was placed in metal tubes, sealed and stored at 50° C. Tubes were removed after 15 and 30 days and ASTM sheets were prepared and allowed to cure for 7 days at 70° F. and 50% R. H. Below are the results obtained from these sheets.

TABLE I

| Days at 50° C. | 0 | 15 | 30 |
|---|---|---|---|
| Shore A | 20 | 13 | 12 |
| Tensile, psi | 225 | 51 | 0 |
| Elongation, % | 862 | 483 | 500 |

After 30 days at 50° C., the material has lost approximately all its tensile strength and is useless as an RTV sealant.

EXAMPLE 2

To 1,000 parts by weight of Composition A of Example 1, there is added 70.4 grams of a fresh solution containing 60 parts by weight of methyl tris(2-ethylhexanoxy)silane, 10 parts by weight of tris(trimethoxy silyl propyl maleate) and 0.4 parts of dibutyl tin diacetate. The material was stored and tested as described in Example 1. Below are the results obtained:

TABLE II

| Days at 50° C. | 0 | 15 | 30 |
|---|---|---|---|
| Shore A | 18 | 13 | 13 |
| Tensile, psi | 261 | 220 | 141 |
| Elongation, % | 874 | 913 | 875 |

This material also shows significant losses in physical properties as a function of time stored at 50° C.

EXAMPLE 3

A mixture of 60 parts of methyl tris(2-ethylhexanoxy)silane, 10 parts of the bis trimethoxy silyl propyl maleate and 0.4 parts of dibutyl tin diacetate was stored in sealed jars at 50° C. for 7 days. This aged catalyst solution was then added to 1,000 parts by weight of the Composition A described in Example 1.

The compounded material was stored and tested as described in Example 1. Below are the results in Table III.

TABLE III

| Days at 50° C. | 0 | 15 | 30 |
|---|---|---|---|
| Shore A | 17 | 16 | 15 |
| Tensile, psi | 167 | 203 | 230 |
| Elongation, % | 752 | 750 | 780 |

After 30 days at 50° C., the physical properties obtained from the cured material is essentially unchanged and there is a dramatic improvement over the results obtained in Example 1.

EXAMPLE 4

A mixture of 60 parts of methyl tris(2-ethylhexanoxy)silane, 10 parts of Isocyanurate T (1,3,5-tris-trimethoxyl silylpropylisocyanurate) and 0.4 parts of dibutyl tin diacetate was stored at 50° C. in a sealed jar for 7 days. The mixture was then added to 1,000 parts of Composition A of Example I. The compounded material was stored and tested as described in Example I and the results are shown in Table IV below.

TABLE IV

| Days at 50° C. | 0 | 15 | 30 |
|---|---|---|---|
| Shore A | 20 | 18 | 16 |
| Tensile, psi | 221 | 225 | 197 |
| Elongation, % | 616 | 633 | 650 |

Again physical properties are maintained even after 30 days at 50° C.

It should be noted that even after this accelerated shelf-aging of 30 days at 50° C., which is equivalent to 6–8 months of storage at 25° C. at room temperature the composition substantially maintained its cured physical properties.

EXAMPLE 5

There was prepared a base composition with the same ingredients as Example 1 except 1,000 parts of silanol end-stopped polymer with a silanol content of 0.07, 200 parts of the octamethyl cyclotetrasiloxane treated fumed silica and 150 parts of the trimethyl siloxy end-stopped dimethylpolysiloxane polymer of 100 centipoise viscosity. To this was added 100 parts of the trifunctional oil of Example 4 and 2 parts of the polyether of Example 1.

To 1,000 parts by weight of this composition there was added 75 parts of a mixture of 63.9 parts of methyl tris(2-ethylhexanoxy)silane, 10.65 parts of bis(trimethoxy silyl propyl) maleate and 0.426 parts of dibutyl tin diacetate which mixture was pre-reacted for 4 hrs. at 100° C.

The compounded material was stored and tested as described in Example I and the results are shown in Table V.

TABLE V

| Days at 50° C. | 0 | 90 |
|---|---|---|
| Shore A | 32 | 33 |
| Tensile, psi | 263 | 270 |
| Elongation, % | 300 | 260 |

We claim:

1. A shelf-stable catalyst composition for a one-part room temperature vulcanizable silicone rubber composition comprising the reaction product of an adhesion promoter selected from the class consisting of silyl maleates, silyl fumarates, silyl succinates, silyl isocyanurates and silyl cyanurates with an acyloxy functional silane cross-linking agent wherein there is present from 40 to 80 parts by weight of the acyloxy functional silane and from 5 to 15 parts by weight of the adhesion promoter and wherein the adhesion promoter is reacted with the acyloxy functional silane at a temperature in the range of 50° to 150° C. for a period of time varying from 1 hour to 7 days.

2. The composition of claim 1 wherein the acyloxy functional silane has the formula, $$R_a Si(OAc)_{4-a}$$

where R is a monovalent radical, Ac is an acyloxy radical from 2 to 30 carbon atoms and a varies from 1 to 3.

3. The composition of claim 2 wherein there is further present in the catalyst system from 0.01 to 15 parts by weight of a metal salt of a carboxylic acid with the metal varying from lead to manganese in the Periodic Table.

4. The composition of claim 2 wherein the reaction product is obtained by reacting the adhesion promoter with the acyloxy functional silane at a temperature in the range of 80°–110° C.

5. The composition of claim 3 wherein the acyloxy functional silane is methyl tris(2-ethylhexanoxy) silane.

6. The composition of claim 3 wherein the acyloxy functional silane is methyl trimethoxysilane.

7. The composition of claim 3 wherein the metal salt of a carboxylic acid dibutyl tin diacetate.

8. The composition of claim 3 further including a silanol end-stopped diorganopolysiloxane of the formula,

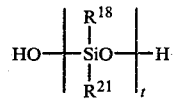

where $R^{18}$ and $R^{21}$ are monovalent hydrocarbon radicals and t varies such that the polymer has a viscosity varying from 500 to 1,000,000 centipoise at 25° C. wherein per 100 parts by weight of the above polymer there is present from 2 to 20 parts by weight of the catalyst composition.

9. The composition of claim 3 wherein the acyloxy functional silane is methyl tris(benzoxy) silane.

10. The composition of claim 8 wherein there is present from 4 to 500 parts by weight of a filler per 100 parts of the silanol end-stopped diorganopolysiloxane.

11. The composition of claim 10 wherein the filler is selected from the class consisting of fumed silica, precipitated silica and calcium carbonate.

12. The composition of claim 11 wherein further including from 2 to 20 parts by weight based on 100 parts of the silanol end-stopped diorganopolysiloxane a fluid polysiloxane containing a high degree of trifunctionality, tetrafunctionality or a mixture of tri- and tetrafunctionality and comprising;

(i) from 5 to 60 mole percent of monoalkylsiloxy units, siloxy units or a mixture of such units;
(ii) from 1 to 6 mole percent of trialkylsiloxy units; and
(iii) from 34 to 94 mole percent of dialkylsiloxy units, said polysiloxane containing from about 0.1 to about 2 percent by weight of silicone bonded hydroxyl groups.

13. The composition of claim 12 which further includes from 1 to 10 parts by weight per 1.0 parts of the silanol end-stopped diorganopolysiloxane of a finely divided iron oxide thermal stabilizer.

14. The composition of claim 13 wherein per 100 parts of the silanol end-stopped diorganopolysiloxane polymer there is present from 1 to 10 parts of fumed silica treated with octamethylcyclotetrasiloxane.

15. The composition of claim 14 wherein the adhesion promoter is 1,3,5-tris-trimethoxy silyl propyl isocyanurate.

16. The composition of claim 14 wherein the adhesion promoter is bis(trimethoxy silyl propyl) maleate.

17. The composition of claim 14 wherein per 100 parts of the silanol end-stopped diorganopolysiloxane there is present from 0.03 to 2.0 parts by weight of a polyether as a sag-control additive.

18. The composition of claim 14 wherein the composition further contains from 1 to 50 parts by weight of a triorganosilyl end-stopped diorganopolysiloxane polymer having from 10 to 5,000 centipoise viscosity where said organo groups are monovalent hydrocarbon radicals.

19. A process for forming a shelf-stable catalyst composition for a one-part room temperature vulcanizable silicone rubber composition comprising reacting an adhesion promoter selected from the class consisting of silyl maleates, silyl fumarates, silyl succinates, silyl isocyanurates and silyl cyanurates with an acyloxy functional silane cross-linking agent before incorporating the catalyst composition with the rest of the ingredients wherein there is present from 40 to 80 parts by weight of the acyloxy functional silane and from 5 to 15 parts by weight of the adhesion promoter wherein the adhesion promoter is reacted with the acyloxy functional silane at a temperature in the range of 50° to 150° C. for a period of time varying from 1 hour to 7 days.

20. The process of claim 19 wherein there is further present in the catalyst system from 0.01 to 15 parts by weight of a metal salt of a carboxylic acid with the metal varying from lead to manganese in the Periodic Table.

21. The process of claim 20 wherein the acyloxy functional silane is methyl tris(2-ethylhexanoxy) silane.

22. The process of claim 20 wherein the acyloxy functional silane is methyl tris acetoxy silane.

23. The process of claim 20 wherein the metal salt of a carboxylic acid is dibutyl tin diacetate.

24. The process of claim 20 further including a silanol end-stopped diorganopolysiloxane polymer of the formula,

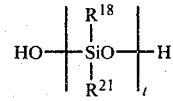

where $R^{18}$ and $R^{21}$ are monovalent hydrocarbon radicals and t varies such that the polymer has a viscosity varying from 500 to 1,000,000 centipoise at 25° C. wherein per 100 parts by weight of the above polymer there is present from 2 to 20 parts by weight of the catalyst reaction product composition.

25. The process of claim 20 wherein the acyloxy functional silane is methyl tris(benzoxy) silane.

26. The process of claim 24 wherein there is present from 4 to 30 parts by weight of a filler per 100 parts of a silanol end-stopped diorganopolysiloxane polymer.

27. The process of claim 26 wherein the filler is selected from the class consisting of fumed silica, precipitated silica and calcium carbonate and mixtures thereof.

28. The process of claim 24 where there is further mixed in the composition from 2 to 20 parts by weight based on 100 parts of the silanol end-stopped diorganopolysiloxane polymer of fluid polysiloxane containing a high degree of trifunctionality, tetrafunctionality or a mixture of tri- and tetrafunctionality and comprising;
(i) from 5 to 60 mole percent of monoalkyl siloxy units or a mixture of such units;
(ii) from 1 to 6 mole percent of trialkyl siloxy units;
(iii) from 34 to 94 mole percent of dialkyl siloxy units, said polysiloxane containing from 0.1 to about 2 percent by weight of hydroxyl groups and wherein such fluid is added to the mixture after the reaction product is formed.

29. The process of claim 28 wherein there is further mixed into the composition from 1 to 10 parts by weight per 100 parts of the silanol end-stopped diorganopolysiloxane polymer of a finely divided iron oxide thermal stabilizer.

30. The process of claim 29 where there is further mixed into the composition per 100 parts of the silanol end-stopped diorganopolysiloxane polymer from 1 to 50 parts by weight of triorgano silyl end-stopped diorganopolysiloxane polymer having from 10 to 5,000 centipoise viscosity where such said organo groups are monovalent hydrocarbon radicals.

31. The process of claim 30 wherein the adhesion promoter is 1,3,5-tris-trimethoxy silyl propyl isocyanurate.

32. The process of claim 30 where the adhesion promoter is bis(tri-methoxysilylpropyl) maleate.

33. The process of claim 30 where per 100 parts of the silanol end-stopped diorganopolysiloxane polymer there is present from 0.03 to 2.0 parts by weight of a polyether as a sag-control additive.

34. The process of claim 30 wherein there is further mixed into the composition per 100 parts of the silanol end-stopped diorganopolysiloxane polymer, from 4 to 28 parts of fumed silica treated with octamethyl cyclotetrasiloxane.

35. The process of claim 19 wherein the acyloxy functional silane has the formula,

where R is a monovalent radical, Ac is an acyloxy radical from 2 to 30 carbon atoms and a varies from 1 to 3.

36. The process of claim 35 wherein the reaction product is obtained by reacting the adhesion promoter with the acyloxy functional silane at a temperature in the range of 80° to 110° C.

* * * * *